(12) United States Patent
Donnelly et al.

(10) Patent No.: US 7,565,867 B2
(45) Date of Patent: Jul. 28, 2009

(54) MULTIPLE ENGINE LOCOMOTIVE CONFIGURATION

(76) Inventors: Frank Wegner Donnelly, 1875 Mc Ewen Place, North Vancouver, British Columbia (CA) V7J 3P8; Bruce Wolff, 3327 Church Street, Vancouver, British Columbia (CA) V5R 4W7

( * ) Notice: Subject to any disclaimer, the term of this patent is extended or adjusted under 35 U.S.C. 154(b) by 495 days.

(21) Appl. No.: 11/201,267

(22) Filed: Aug. 9, 2005

(65) Prior Publication Data

US 2006/0091832 A1    May 4, 2006

Related U.S. Application Data

(60) Provisional application No. 60/692,358, filed on Jun. 20, 2005, provisional application No. 60/618,632, filed on Oct. 13, 2004, provisional application No. 60/607,194, filed on Sep. 3, 2004.

(51) Int. Cl.
    *B61C 7/00* (2006.01)

(52) U.S. Cl. .................................. 105/62.1; 105/26.05

(58) Field of Classification Search .............. 105/26.05, 105/62.1, 62.2; 701/19, 20; 290/3, 4 R, 290/40 R, 40 A, 40 C
See application file for complete search history.

(56) References Cited

U.S. PATENT DOCUMENTS

| | | | |
|---|---|---|---|
| 384,580 A | 6/1888 | Julien | |
| 744,187 A | 11/1903 | Gibbs | |
| 1,199,752 A | 10/1916 | Baker | |
| 1,377,087 A | 5/1921 | Manns | |
| 1,535,175 A | 4/1925 | Mancha | |
| 2,403,933 A | 4/1946 | Lillquist | |
| 2,472,924 A | 6/1949 | Schwendner | |
| 2,510,753 A | 6/1950 | Multhaup | |
| 2,704,813 A | 3/1955 | Stamm | |
| 3,169,733 A | 2/1965 | Barrett, Jr. | |
| 3,443,115 A | 5/1969 | Timmerman, Jr. | |
| 3,569,810 A | 3/1971 | Thiele | |
| 3,596,154 A | 7/1971 | Gurwicz et al. | |
| 3,668,418 A | 6/1972 | Godard | |
| 3,728,596 A | 4/1973 | Hermansson et al. | |
| 3,737,745 A | 6/1973 | Chevaugeon et al. | |
| 3,792,327 A | 2/1974 | Waldorf | |

(Continued)

FOREIGN PATENT DOCUMENTS

CA    1283472    10/1987

(Continued)

OTHER PUBLICATIONS

U.S. Appl. No. 11/131,917, filed May 2005, Donnelly.

(Continued)

*Primary Examiner*—Mark T Le
(74) *Attorney, Agent, or Firm*—Merchant & Gould P.C.

(57) ABSTRACT

In one embodiment, a multi-engine locomotive includes at least one converter to convert mechanical energy outputted by the engines to Direct Current (DC) electrical energy, a traction motor, and a DC bus connected to the engines, converter, and traction motor. The engines are configured to provide a power-per-length and/or power density that is greater than the power-per-length and/or power density of a single-engine locomotive having a power rating approximately the same as the cumulative power rating of the engines in the multi-engine locomotive.

40 Claims, 11 Drawing Sheets

U.S. PATENT DOCUMENTS

| | | |
|---|---|---|
| 3,832,625 A | 8/1974 | Gyugyi |
| 3,898,937 A | 8/1975 | Johnson |
| 3,919,948 A | 11/1975 | Kademann |
| 3,930,189 A | 12/1975 | Smith |
| 3,970,160 A | 7/1976 | Nowick |
| 3,982,164 A | 9/1976 | de Buhr |
| 3,997,822 A | 12/1976 | Logston et al. |
| 4,035,698 A | 7/1977 | Soderberg |
| 4,070,562 A | 1/1978 | Kuno et al. |
| 4,075,538 A | 2/1978 | Plunkett |
| 4,090,577 A | 5/1978 | Moore |
| 4,095,147 A | 6/1978 | Mountz |
| 4,096,423 A | 6/1978 | Bailey et al. |
| 4,107,402 A | 8/1978 | Dougherty et al. |
| 4,152,758 A | 5/1979 | Bailey et al. |
| 4,199,037 A | 4/1980 | White |
| 4,204,143 A | 5/1980 | Coleman |
| 4,217,527 A | 8/1980 | Bourke et al. |
| 4,284,936 A | 8/1981 | Bailey et al. |
| 4,309,645 A | 1/1982 | De Villeneuve |
| 4,344,139 A | 8/1982 | Miller et al. |
| 4,347,569 A | 8/1982 | Allen, Jr. et al. |
| 4,369,397 A | 1/1983 | Read |
| 4,417,194 A | 11/1983 | Curtiss et al. |
| 4,423,362 A | 12/1983 | Konrad et al. |
| 4,471,276 A | 9/1984 | Cudlitz |
| 4,471,421 A | 9/1984 | Brown et al. |
| 4,495,449 A | 1/1985 | Black et al. |
| 4,498,016 A | 2/1985 | Earleson et al. |
| 4,523,134 A | 6/1985 | Kinoshita et al. |
| 4,644,232 A | 2/1987 | Nojiri et al. |
| 4,700,283 A | 10/1987 | Tsutsui et al. |
| 4,701,682 A | 10/1987 | Hirotsu et al. |
| 4,719,861 A | 1/1988 | Savage et al. |
| 4,799,161 A | 1/1989 | Hirotsu et al. |
| 4,896,090 A | 1/1990 | Balch et al. |
| 4,900,944 A | 2/1990 | Donnelly |
| 4,936,610 A | 6/1990 | Kumar et al. |
| 4,941,099 A | 7/1990 | Woody et al. |
| 4,944,539 A | 7/1990 | Kumar et al. |
| 4,950,964 A | 8/1990 | Evans |
| 4,961,151 A | 10/1990 | Early et al. |
| 5,129,328 A | 7/1992 | Donnelly |
| 5,212,431 A | 5/1993 | Origuchi et al. |
| 5,264,764 A | 11/1993 | Kuang |
| 5,281,900 A | 1/1994 | Park |
| 5,289,093 A | 2/1994 | Jobard |
| 5,306,972 A | 4/1994 | Hokanson et al. |
| 5,317,669 A | 5/1994 | Anderson et al. |
| 5,331,261 A | 7/1994 | Brown et al. |
| 5,332,630 A | 7/1994 | Hsu |
| 5,343,970 A | 9/1994 | Severinsky |
| 5,359,228 A | 10/1994 | Yoshida |
| 5,376,868 A | 12/1994 | Toyoda et al. |
| 5,392,716 A | 2/1995 | Orschek et al. |
| 5,424,948 A | 6/1995 | Jorday, Jr. |
| 5,428,538 A | 6/1995 | Ferri |
| 5,436,538 A | 7/1995 | Garvey et al. |
| 5,436,540 A | 7/1995 | Kumar |
| 5,436,548 A | 7/1995 | Thomas |
| 5,453,672 A | 9/1995 | Avitan |
| 5,480,220 A | 1/1996 | Kumar |
| 5,508,924 A | 4/1996 | Yamashita |
| 5,510,203 A | 4/1996 | Hamada et al. |
| 5,510,693 A | 4/1996 | Theobald |
| 5,511,749 A | 4/1996 | Horst et al. |
| 5,528,148 A | 6/1996 | Rogers |
| 5,564,795 A | 10/1996 | Engle |
| 5,568,023 A | 10/1996 | Grayer et al. |
| 5,580,677 A | 12/1996 | Morishita et al. |
| 5,580,685 A | 12/1996 | Shenk et al. |
| 5,585,706 A | 12/1996 | Avitan |
| 5,589,743 A | 12/1996 | King |
| 5,610,499 A | 3/1997 | Rogers |
| 5,610,819 A | 3/1997 | Mann et al. |
| 5,629,567 A | 5/1997 | Kumar |
| 5,629,596 A | 5/1997 | Iijima et al. |
| 5,629,601 A | 5/1997 | Feldstein |
| 5,631,532 A | 5/1997 | Azuma et al. |
| 5,646,510 A | 7/1997 | Kumar |
| 5,659,240 A | 8/1997 | King |
| 5,661,378 A | 8/1997 | Hapeman |
| 5,677,610 A | 10/1997 | Tanamachi et al. |
| 5,685,507 A | 11/1997 | Horst et al. |
| 5,696,438 A | 12/1997 | Hamilton |
| 5,698,955 A | 12/1997 | Nii |
| 5,710,699 A | 1/1998 | King et al. |
| 5,735,215 A | 4/1998 | Tegeler |
| 5,751,137 A | 5/1998 | Kiuchi et al. |
| 5,765,656 A | 6/1998 | Weaver |
| 5,820,172 A | 10/1998 | Brigham et al. |
| 5,856,037 A | 1/1999 | Casale et al. |
| 5,898,281 A | 4/1999 | Bossoney et al. |
| 5,898,282 A | 4/1999 | Drozdz et al. |
| 5,939,861 A | 8/1999 | Joko et al. |
| 5,964,309 A | 10/1999 | Kimura et al. |
| 5,992,950 A | 11/1999 | Kumar et al. |
| 5,998,880 A | 12/1999 | Kumar |
| 6,012,011 A | 1/2000 | Johnson |
| 6,021,251 A | 2/2000 | Hammer et al. |
| 6,023,137 A | 2/2000 | Kumar et al. |
| 6,025,086 A | 2/2000 | Ching |
| 6,027,181 A | 2/2000 | Lewis et al. |
| 6,066,897 A * | 5/2000 | Nakamura ............... 290/4 A |
| 6,082,834 A | 7/2000 | Kolbe et al. |
| 6,104,148 A | 8/2000 | Kumar et al. |
| 6,175,272 B1 | 1/2001 | Takita |
| 6,208,097 B1 | 3/2001 | Reddy et al. |
| 6,211,646 B1 | 4/2001 | Kouzu et al. |
| 6,218,807 B1 | 4/2001 | Sakaue et al. |
| 6,274,998 B1 | 8/2001 | Kaneko et al. |
| 6,308,639 B1 | 10/2001 | Donnelly et al. |
| 6,331,365 B1 | 12/2001 | King |
| 6,359,346 B1 | 3/2002 | Kumar |
| 6,367,891 B1 | 4/2002 | Smith et al. |
| 6,371,573 B1 | 4/2002 | Goebels et al. |
| 6,384,489 B1 | 5/2002 | Bluemel et al. |
| 6,405,705 B1 | 6/2002 | Dunsworth et al. |
| 6,408,766 B1 | 6/2002 | McLaughlin et al. |
| 6,417,646 B1 | 7/2002 | Huykman et al. |
| 6,421,618 B1 | 7/2002 | Kliman et al. |
| 6,441,581 B1 | 8/2002 | King et al. |
| 6,449,536 B1 | 9/2002 | Brousseau et al. |
| 6,456,674 B1 | 9/2002 | Horst et al. |
| 6,456,908 B1 | 9/2002 | Kumar |
| D464,622 S | 10/2002 | Donnelly |
| 6,470,245 B1 | 10/2002 | Proulx |
| 6,486,568 B1 | 11/2002 | King et al. |
| 6,497,182 B2 | 12/2002 | Melpolder et al. |
| 6,507,506 B1 | 1/2003 | Piñas et al. |
| 6,532,405 B1 | 3/2003 | Kumar et al. |
| 6,537,694 B1 | 3/2003 | Sagiura et al. |
| 6,564,172 B1 | 5/2003 | Till |
| 6,581,464 B1 | 6/2003 | Anderson et al. |
| 6,591,758 B2 | 7/2003 | Kumar |
| 6,608,396 B2 | 8/2003 | Downer et al. |
| 6,611,116 B2 | 8/2003 | Bachman et al. |
| 6,612,245 B2 | 9/2003 | Kumar et al. |
| 6,612,246 B2 | 9/2003 | Kumar |
| 6,615,118 B2 * | 9/2003 | Kumar ...................... 701/19 |
| 6,618,662 B2 | 9/2003 | Schmitt et al. |
| 6,627,345 B1 | 9/2003 | Zemlok et al. |
| 6,634,303 B1 | 10/2003 | Madsen et al. |
| 6,653,002 B1 | 11/2003 | Parise |

| | | |
|---|---|---|
| 6,658,331 B2 | 12/2003 | Horst et al. |
| 6,678,972 B2 | 1/2004 | Naruse et al. |
| 6,688,481 B1 | 2/2004 | Adner et al. |
| 6,691,005 B2 | 2/2004 | Proulx |
| 6,697,716 B2 | 2/2004 | Horst |
| 6,725,134 B2 | 4/2004 | Dillen et al. |
| 6,728,606 B2 | 4/2004 | Kumar |
| 6,737,822 B2 | 5/2004 | King |
| 6,765,315 B2 | 7/2004 | Hammerstrom et al. |
| 6,812,656 B2 | 11/2004 | Donnelly et al. |
| 6,823,835 B2 | 11/2004 | Dunsworth et al. |
| 6,829,529 B2 | 12/2004 | Trefzer et al. |
| 6,829,556 B2 | 12/2004 | Kumar |
| 6,879,054 B2 | 4/2005 | Gosselin |
| 6,885,920 B2 | 4/2005 | Yakes et al. |
| 6,909,200 B2 | 6/2005 | Bouchon |
| 6,909,201 B2 | 6/2005 | Murty et al. |
| 6,909,959 B2 | 6/2005 | Hallowell |
| 6,941,218 B2 | 9/2005 | Wolf et al. |
| 6,973,880 B2 | 12/2005 | Kumar |
| 7,102,313 B2 | 9/2006 | Kadota et al. |
| 2002/0190525 A1 | 12/2002 | Worden et al. |
| 2003/0150352 A1 | 8/2003 | Kumar |
| 2003/0151387 A1 | 8/2003 | Kumar |
| 2003/0233959 A1 | 12/2003 | Kumar |
| 2004/0133315 A1 | 7/2004 | Kumar et al. |
| 2005/0024001 A1 | 2/2005 | Donnelly et al. |
| 2005/0045058 A1 | 3/2005 | Donnelly et al. |
| 2005/0189886 A1 | 9/2005 | Donnelly |
| 2005/0189887 A1 | 9/2005 | Donnelly et al. |
| 2005/0206230 A1 | 9/2005 | Donnelly |
| 2005/0206331 A1 | 9/2005 | Donnelly |
| 2005/0251299 A1 | 11/2005 | Donnelly |
| 2005/0279242 A1 | 12/2005 | Maier |
| 2005/0279243 A1 | 12/2005 | Bendig et al. |
| 2006/0001399 A1 | 1/2006 | Salasoo et al. |
| 2006/0061307 A1 | 3/2006 | Donnelly |
| 2006/0076171 A1 | 4/2006 | Donnelly et al. |

FOREIGN PATENT DOCUMENTS

| | | |
|---|---|---|
| CA | 2411132 | 11/2002 |
| GB | 873167 | 3/1960 |
| GB | 1129709 | 11/1966 |
| GB | 1 312 699 | 10/1970 |
| GB | 2 005 205 A | 9/1977 |
| WO | WO 03/072388 | 9/2003 |
| WO | WO 2004/042890 | 5/2004 |
| WO | WO 2005/030550 | 4/2005 |
| WO | WO 2005/079504 | 9/2005 |
| WO | WO 2005/084335 | 9/2005 |
| WO | WO 2005/086910 | 9/2005 |
| WO | WO 2005/097573 | 10/2005 |
| WO | WO 2005/114810 | 12/2005 |
| WO | WO2005/114811 | 12/2005 |
| WO | WO 2006/020587 | 2/2006 |
| WO | WO 2006/020667 | 2/2006 |
| WO | WO/2006/116479 | 11/2006 |

OTHER PUBLICATIONS

U.S. Appl. No. 11/131,930, filed May 2005, Watson.
U.S. Appl. No. 11/143,252, filed Jun. 2005, Donnelly.
U.S. Appl. No. 11/411,986, filed Apr. 2006, Donnelly.
U.S. Appl. No. 11/411,987, filed Apr. 2006, Donnelly.
U.S. Appl. No. 11/412,071, filed Apr. 2006, Donnelly.
PCT International Search Report, Jul. 20, 2006, 2 pages.
PCT Written Opinion of the International Search Authority, Jul. 20, 2006, 3 pages.
Supplemental Declaration of Frank Donnelly Under 37 CFR § 1.98; dated Jan. 25, 2007 for U.S. Appl. No. 11/143,252, 6 pages.
"Comparative Economic Assessment of a Natural Gas Fueled Locomotive with On-Board CNG Storage to Diesel and LNG Variants", Donnelly et al, IEEE/ASME Joint Railroad Conference, Baltimore, Apr. 1995, 30 pages.
Design of Switched Reluctance Motors and Development of a Universal Controller for Switched Reluctance and Permanent Magnet Brushless DC Motors', Phd Dissertation, Virginia Polytechnic Institute and State University, Prahveen Vijayraghavan, Blacksburg, VA, Nov. 2001, 215 pages.
"Development of a New Battery System for Hybrid Vehicle", Tomokazu Yamauchi et al, Toyota, presented at the EVS 17 in Montreal, Oct. 2000, 7 pages.
"Lead-Acid Battery State of Charge vs. Voltage", Richard Perez, Home Power #36, Aug./Sep. 1993, 5 pages.
"Li-Ion Battery-Powered Buck-Boost Regulator Minimizes Portable Product Size", Chen, IIC-China/ESC-China Conference Proceedings, 2002, 5 pages.
"Linear/Switchmode Voltage Regulator Handbook" Motorola, Inc. 1982, 3 pages.
"LNG as a Fuel for Railroads: Assessment of Technology Status and Economics", Pera and Moyer, Acurex Corporation, 1993, Gas Research Institute contract No. 5091-292-2153, 122 pages.
"Locomotive Energy Storage System," Advanced Railway Technology, Inc. (Dec. 1985), 22 pages.
"Performance and Control of the Switched Reluctance Motor", Dahdah et al, University of Western Sydney, Australia, 4 pages.
"Supercapacitive Energy Storage for Diesel-Electric Locomotives", Destraz, Barrade and Rufer, Swiss Federal Institute of Technology, paper presented at SPEEDAM 2004, Jun. 16, Capri, Italy, 6 pages.
"The Control of Switched Reluctance Drives and their Use for Flywheel Energy Storage", Brabandere et al., 5 pages.
"Thermal Evaluation of the Honda Insight Battery Pack" M.D. Zolot et. al. National Renewable Energy Laboratory, Presented at the 36th Intersociety Energy Conversion Engineering Conference, Savannah Georgia, Jul. 29 to Aug. 2, 2001, 9 pages.
Berg, "Concept Truck Addresses Future Clean Air Demands With Hybrid Turbine-Electric Powertrain," *Emissions Alternatives Fuels* (date unknown), pp. 55-57.
C.E. Band et al., "Development of and Operational Experience with a High Powered D.C. Chopper for 1500 Volt D.C. Railway Equipment," Institution of Electrical Engineers Conference Publication 53 on Power Thyristors and Their Applications, Part 1 (May 1969), 1-page.
Declaration of Ronald Bailey under 37 CFR § 1.98 dated Dec. 3, 2004 for U.S. Appl. No. 10/650,011, 3 pages.
Declaration of Frank Donnelly Under 37 CFR § 1.98, 5 pages.
FMTV—with HybriDrive Propulsion System, pp. 1-3.
Hassan Moghbelli et al., "Chopper Design for NICTD Locomotives," Proceedings of the 1993 IEEE/ASME Joint Railroad Conference, Apr. 1993, pp. 67-75.
Joseph Szymborski et al., "Examination of VRLA Battery Cells Sampled from the Metlakatla Battery Energy Storage System", 15 pages.
Kostic et al., "An Analytic Solution of the Choppers Ripple Currents," Proceedings of the 1993 IEEE/ASME Joint Railroad Conference, Apr. 1993, pp. 103-107.
M.J. Hapeman et al., "Diesel Electric Locomotive Propulsion Systems—A Look into the Future," IEEE Technical Papers Presented at the 1985 Joint ASME/IEEE Railroad Conference, New York City, NY, Apr. 16-18, 1985, pp. 108-115.
Mendler, "The Technological Opportunities of Hybrid Electric Vehicles," Society of Automotive Engineers, Inc. (1996), pp. 1-16.
Mercer, "Innovative Use of Horsepower—Hybrid Bus Powered by Gas Turbine," *Diesel Progress* (Dec. 1997), pp. 56-57.
Nene, "Advanced Propulsion Systems for Urban Rail Vehicles: Chapter 2: DC Drives with a Chopper Controller," Prentice-Hall, Inc. (1985), pp. 18-45.
Press Release: "French Railway Company Voies Ferees Legeres et Industielles (VFLI) Puts Its Trust in Deutch Engines", Jun. 2003, 2 pages.
Thompson, "Electric Transportation," International Textbook Co., Scranton, Pa; (1$^{st}$ Ed., 1940), pp. 254-262.

Perreault, David J. et al., "A New Design for Automotive Alternators", Massachusetts Institute of Technology, 2000, 12 pages.

Railway Age, "Switchers, the Gen-Set generation", Simmons-Boardman Publishing Corporation, vol. 207 No. 3, copyright 2006, 1 page.

"The Car and Locomotive Encyclopedia" by Kalmbach Publishing Company, 1980, 3 pages.

"Motor Control Electronics Handbook" edited by Richard Valentine, McGraw-Hill 1998, ISBN 0-07-066810-8, 1998, 31 pages.

"Progress in Overcoming the Failure Modes Peculiar to VRLA Batteries", A. Cooper, P.T. Moseley, Journal of Power Sources 113 (2003) 200-208.

"Research Results from the Advanced Lead-Acid Battery Consortium Point the Way to Longer Life and Higher Specific Energy for Lead/Acid Electric-vehicle Batteries", P.T. Moseley, Journal of Power Sources 73 (1998) 122-126.

"Improving the Valve-Regulated Lead Acid Battery", P.T. Moseley, Journal of Power Sources 88 (2000) 71-77.

"Keeping Up the Pressure-Strategies to Maintain Plate-Group Pressure and Extend the Cycle Life of VRLA Batteries", M.J. Weighall, Journal of Power Sources 95 (2001) 209-217.

"VRLA Traction", First International Symposium on the Use of VRLA Batteries in Traction Application, Honolulu, Jun. 2005.

* cited by examiner

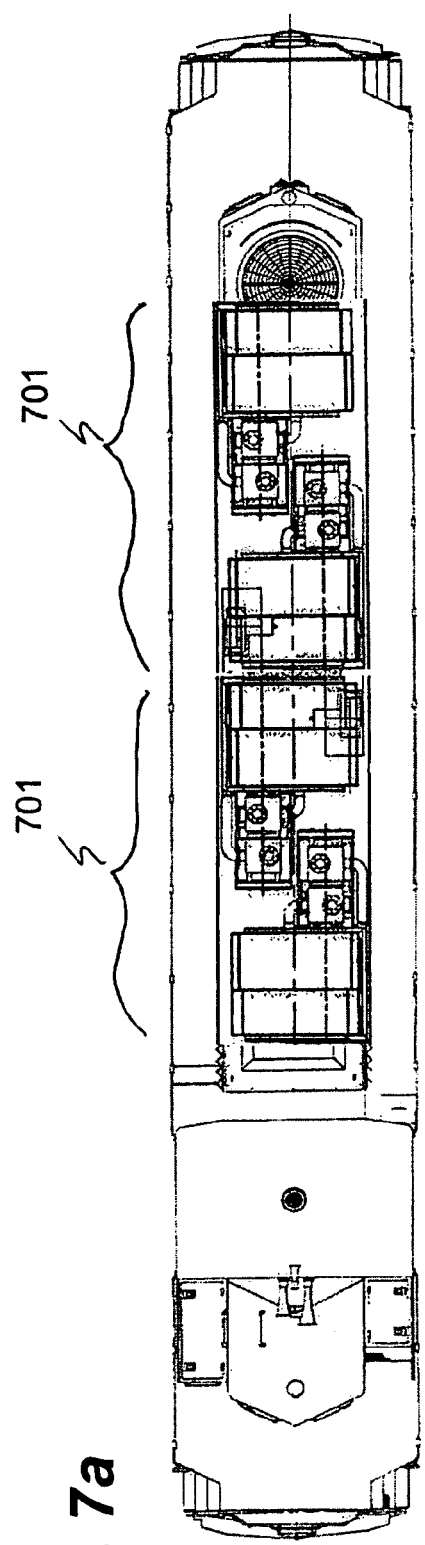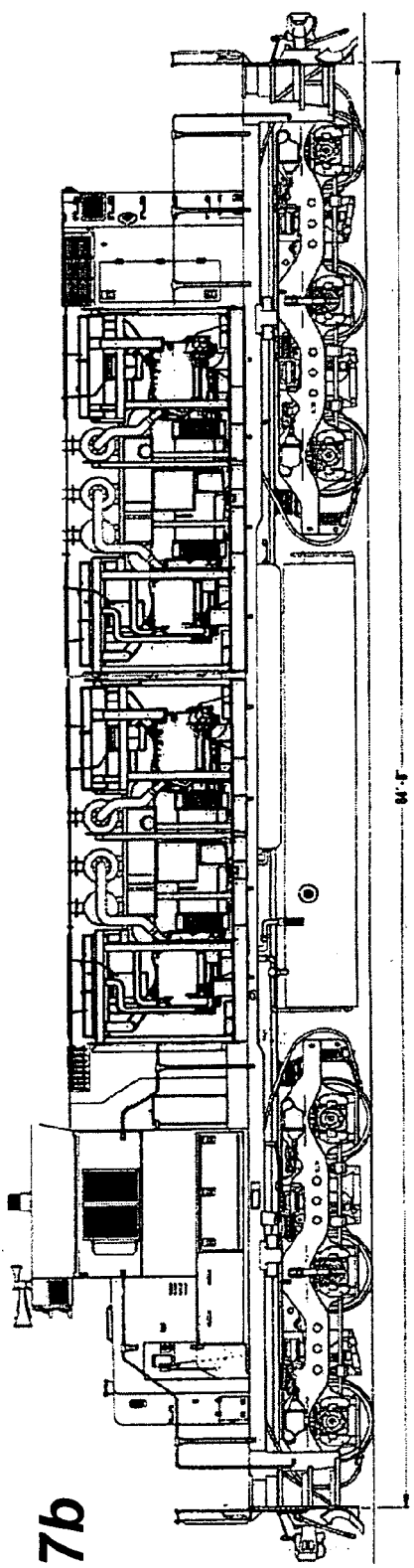
Fig. 7a
Fig. 7b

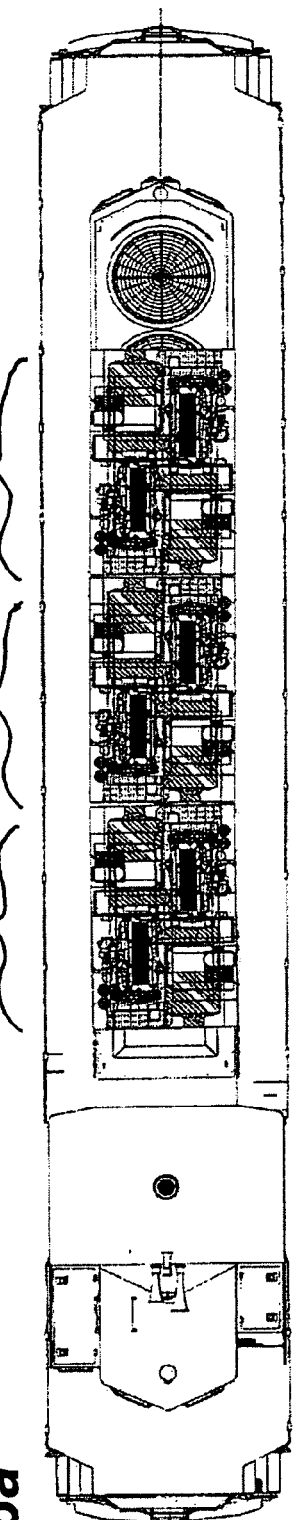
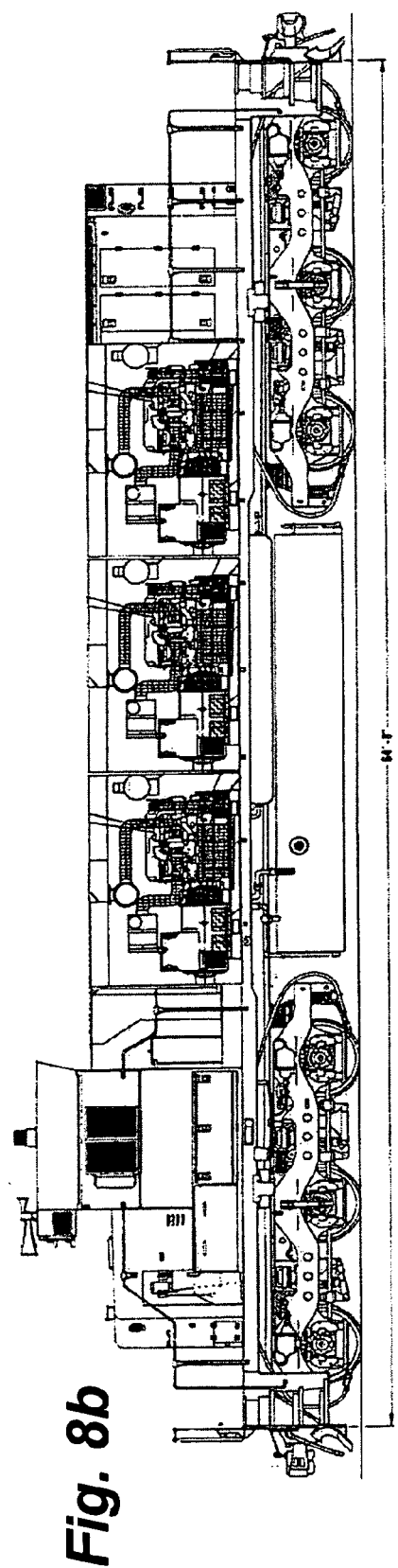
Fig. 8a
Fig. 8b

MULTIPLE ENGINE LOCOMOTIVE CONFIGURATION

CROSS REFERENCE TO RELATED APPLICATION

The present application claims the benefits, under 35 U.S.C. §119(e), of U.S. Provisional Application Ser. Nos.: (a) 60/607,194, filed Sep. 3, 2004, entitled "Locomotive Power Train Architecture"; (b) 60/618,632, filed Oct. 13, 2004, entitled "Locomotive Power Train Architecture"; and (c) 60/692,358, filed Jun. 20, 2005, entitled "Multiple Engine Locomotive Configuration"; all to Donnelly, et al. and each of which is incorporated herein by this reference.

FIELD

The present invention relates generally to vehicular propulsion systems and specifically to locomotive propulsion systems.

BACKGROUND

Railroads are under increasing pressure to reduce emissions and fuel consumption. One of several responses to these forces has been the development of hybrid locomotives. Donnelly has disclosed the use of a battery-dominant hybrid locomotive in U.S. Pat. No. 6,308,639 which is incorporated herein by reference. Hybrid locomotives can reduce emissions and fuel consumption in many rail situations such as yard switching but they are less effective for medium haul freight or commuter trains.

In the search for efficient engine and fuel strategies, many different power plant and power delivery strategies have been investigated. Some of these have involved approaches which attempt to synchronize multiple engines of the same type or to utilize different fuels for the same engine. Other strategies involve combinations of conventional and hybrid locomotives in a consist.

Donnelly has also disclosed a method and apparatus for controlling power provided to DC traction motors by furnishing an individual chopper circuit for each traction motor in U.S. Pat. No. 6,812,656 which is incorporated herein by reference. Donnelly et al. have disclosed a method of monitoring, synchronizing and optimizing the operation of the locomotive drive train in U.S. patent application Ser. No. 10/649,286; have also disclosed a method of allocating energy amongst members of a consist in U.S. patent application Ser. No. 11/070,848; and have disclosed a method for monitoring, controlling and/or optimizing the emission profile for a hybrid locomotive or consist of hybrid locomotives in U.S. patent application Ser. No. 11/095,036, all of which are also incorporated herein by reference.

In U.S. Provisional Applications 60/607,194 and 60/618,632, Donnelly et al. have further disclosed a general electrical architecture for locomotives based on plurality of power sources, fuel and drive train combinations. The power sources may be any combination of engines, energy storage and regenerative braking. Donnelly et all have also disclosed a versatile multiple engine control strategy that can by applied to locomotives to reduce emissions and fuel consumption in U.S. Provisional Application 60/674,837. These provisional applications are also incorporated herein by reference.

Multi-engine locomotives are not new. Often a multi-engine locomotive can be comprised of engines each of which can provide power to separate driving wheel assemblies or separate groups of driving wheel assemblies. In other designs, the AC electrical output of two engine/alternator systems have been synchronized to provide power to an AC bus which, in turn, provides power to all the locomotive's traction motors. Older multi-engine designs have utilized synchronized mechanical transmissions to supply power directly to the driving wheel assemblies.

Recently, a French Railway Company, VFLI, disclosed a dual engine locomotive utilizing a common DC bus electrical transmission where the two engines need not be synchronized. The second engine in this design is brought on-line using a simple algorithm. Under this algorithm, when the power output of the first engine exceeds 70% of its rated value, the second engine is brought on-line.

However, there remains a need for a versatile multiple engine packaging strategy that optimizes the power density of the locomotive power plant while reducing emissions and fuel consumption.

SUMMARY

These and other needs are addressed by the various embodiments and configurations of the present invention which are directed generally to packing a plurality of small engines in a way that increases the power density over that of a single engine of the same output power.

In an embodiment of the present invention, a plurality of engines with their associated systems such as for example turbo chargers, lubrication, cooling, and emissions controls are packaged to substantially maximize power density. This packaging strategy is made possible by the use of an electric transmission power distribution configuration. In this configuration, the engines deliver power to a converter (which typically includes an electric alternator that converts mechanical shaft power of the engine to AC electrical power and a rectifier apparatus that converts the AC electrical power to DC power which provides DC power to a common DC bus. The DC bus then provides power to traction motors. The traction motors may be AC traction motors in which case power from the DC bus is converted to AC power by one or more inverters. The traction motors may be DC traction motors in which case power from the DC bus is controlled by one or more choppers. This system of converting mechanical power from one or more engines to electrical power to drive traction motors is commonly called an electric transmission. The electric transmission allows the engines to be located away from the traction motors which are commonly located near gearboxes, drive shafts or axles assemblies.

Another embodiment of the present invention is directed at a packaging strategy for a multi-engine locomotive comprised of as many as about eight separate engines. The invention is based on a common DC bus electrical architecture so that engines need not be synchronized, need not be of the same power rating and may be operated at different power and engine rpm combinations.

In a preferred embodiment of the present invention, engines and their associated alternator/rectifier systems are placed side by side in pairs and typically facing in opposite directions. However, if warranted by engines and alternator assemblies having comparable widths, they may face in the same direction. These configurations allow one or more two-engine modules to be arranged on a deck of a locomotive so that the width, height and length of the engine compartment need not be changed significantly from that of the same locomotive with a single large engine. As will be discussed, this two engine module arrangement can provide advantages for servicing, maintenance and replacement. Another potential advantage of this arrangement is that some elements of the lubricating systems and cooling systems can be common to both engines, thus further utilizing space more efficiently. An important feature of this embodiment is that ancillary equipment such as for example oil filters, air filters, oil dip sticks, fuel filters, starter motors and batteries and the like can be located on the outside of the engine pairs so that they are readily accessible for inspection, servicing, maintenance and replacement.

In a first configuration of the preferred embodiment, V-type engines are packaged to achieve a power density that is approximately that of a single large engine of the same power.

In a second configuration of the preferred embodiment, in-line engines are packaged to achieve a power density that is significantly greater than that of a single large engine of the same power.

In the preferred embodiments, elements of the engine cooling systems, lubrication systems and emissions systems are common to at least two engines.

Advantages of the packaging system of the present invention can include:
 (a) greater power density can be achieved than a single engine of the same power
 (b) smaller engines are more readily mass produced
 (c) smaller engines are generally more fuel efficient per unit power output
 (d) smaller engines inherently produce less emissions per unit power output
 (e) smaller engines can be removed with smaller lifting equipment These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

The following definitions are used herein:

A locomotive is generally a self-propelled railroad prime mover which is powered either by a steam engine, diesel engine or externally such as from an overhead electrical catenary or an electrical third rail.

A diesel-electric locomotive is commonly a diesel powered railroad prime mover which includes an engine, generator, and traction motors on each propulsion axle.

A diesel-hydraulic locomotive is commonly a diesel powered railroad prime mover which includes an engine, a transmission and a drive system connecting one or more propelling axles. Less commonly, a diesel-hydraulic locomotive includes an engine, an electric motor and pumps which operate hydraulic motors on one or more propelling axles.

A cabless locomotive is a locomotive not having a functional operator's enclosure or cab. In a functional operator's cab, the locomotive may be operated with protection from outside weather, noise and fumes. In a functional operator's cab, the operator has available at least throttle controls, braking controls and locomotive status displays. A cabless locomotive may not have an operator's cab or it may have the cab windows blacked out and the door locked to render the cab unuseable.

Power density as used herein is power per unit volume (watts per cubic meter).

Specific power as used herein is power per unit mass (watts per kilogram).

In a dual-mode hybrid, the energy storage and prime power are approximately balanced. For example, a dual-mode hybrid can operate on electric drive only, on engine power only, or on a combination of both. These vehicles are typically parallel hybrids.

A battery-dominant hybrid locomotive is a dual-mode hybrid locomotive where the energy storage apparatus is a battery pack and the battery pack is capable of supplying approximately as much or more instantaneous power than the prime power source when both are engaged with the propulsion system.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

BRIEF DESCRIPTION OF THE DRAWINGS

FIG. 7 a schematic of a modular configuration for a multi-engine locomotive based on V type engines.

FIG. 8 a schematic of a modular configuration for a multi-engine locomotive based on in-line type engines.

DETAILED DESCRIPTION

General Architecture

Figure 1:
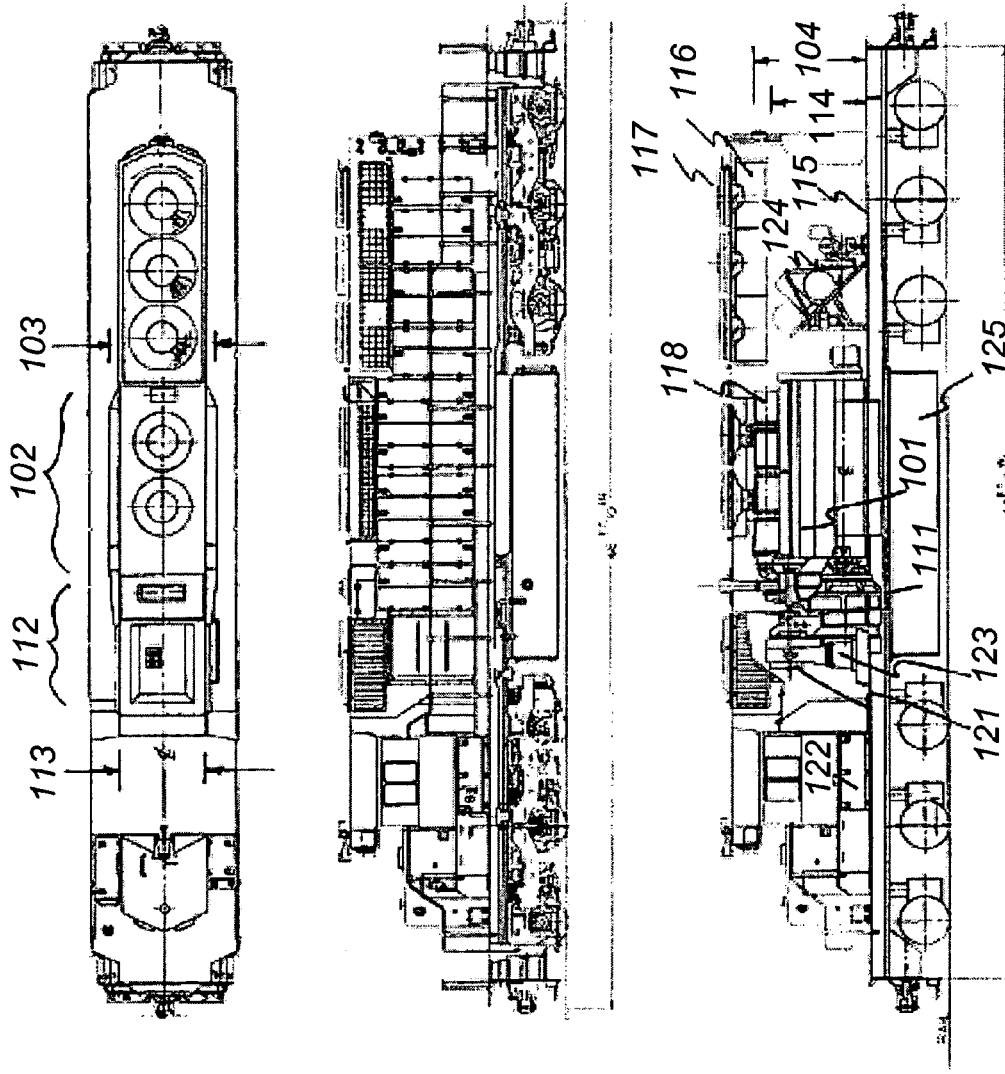
FIG. 1 is a schematic of a single-engine locomotive which is prior art.

FIG. 1, which is prior art, shows a top view FIG. 1a, a side view FIG. 1b and a cutaway side view FIG. 1c of a typical diesel-electric locomotive powered by a single large diesel engine. This figure was adapted from a drawing found in "The Car and Locomotive Encyclopedia" by Kalmbach Publishing Company. The diesel engine 101 occupies an approximate length 102, an approximate width 103 and an approximate height 104. A large diesel engine such as this commonly requires a large alternator assembly 111 which is shown herein as occupying an approximate length 112, an approximate width 113 and an approximate height 114. The locomotive deck 115 is typically occupied by other equipment including starter motor batteries 122, engine air filter 121, generator and traction motor blower 123, engine coolant water, engine oil and water and engine oil filters 124. The engine cooling system is, in part, comprised of large radiators 116 mounted under cooling fans 117 mounted on the top of the locomotive hood. The exhaust manifolds 118 of the engine 101 are mounted above the engine and additional hood mounted cooling fans. The locomotive's diesel fuel tank 125 is also shown. The engine 101, alternator 112 and ancillary engine equipment all comprise the engine system. The means of estimating the approximate volume of the engine system is discussed after FIG. 8 in the section on Effective Power Density.

Figure 2:
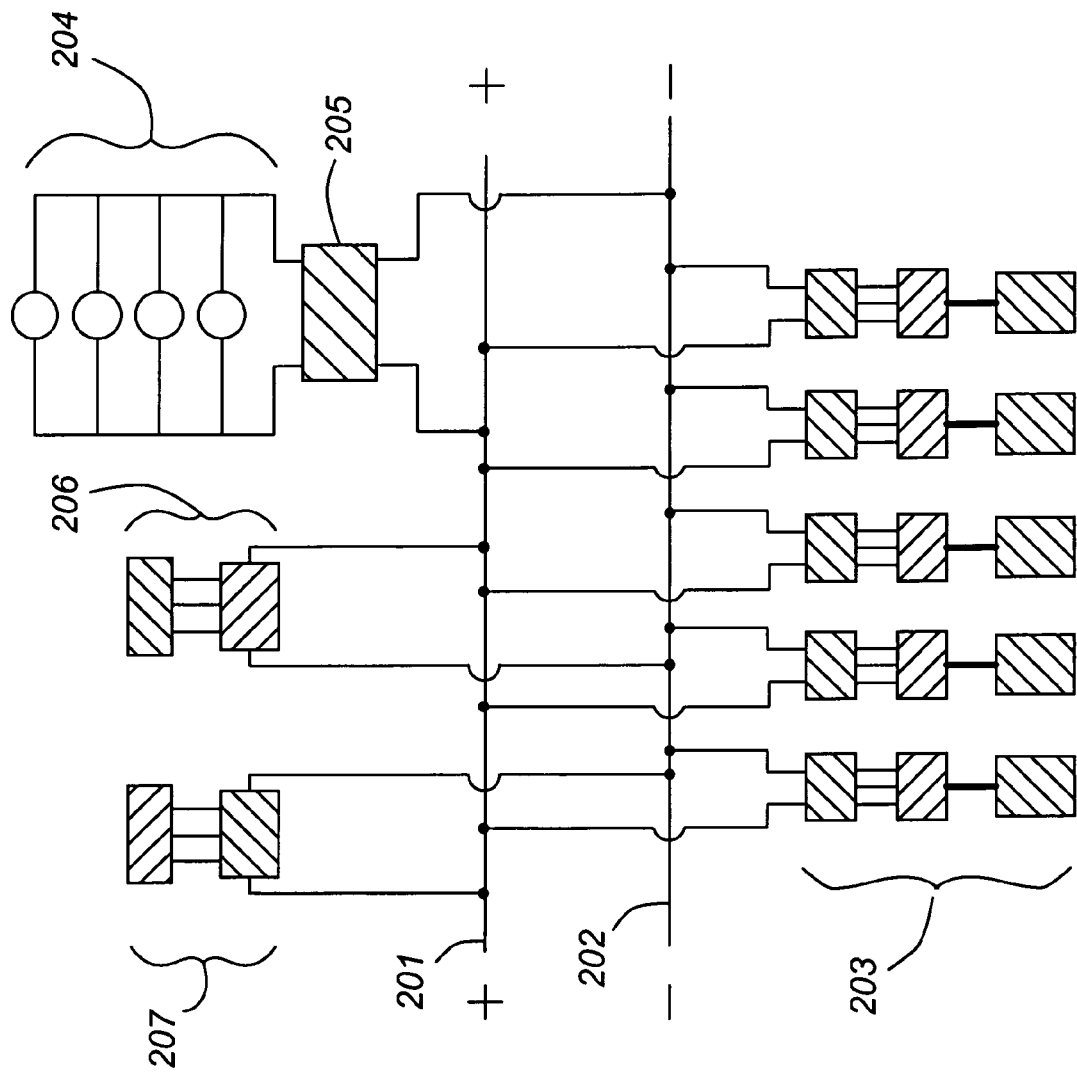
FIG. 2 is a schematic of the principal propulsion components of a multi-engine locomotive.

FIG. 2 is a schematic diagram showing an example of five engines 203 connected in parallel to a DC bus represented by bus bars 201 and 202 to provide power to four traction motors 204 controlled through a power control device 205. If the traction motors are AC motors, the power control device is an inverter. If the traction motors are DC motors, the power control device is a chopper. The same principles can be applied to any number of engines in the range of two engines to about eight engines. Eight engines could in principle correspond to the eight notches of power control typically used in many locomotives. This example illustrates how a number of smaller engines which may have highly developed efficiency and emission controls can be used in place of a single large engine. In this example, four traction motors are used but, as can be appreciated, the number and type of drive motors is independent of the number and type of power supplies. Each engine is shown has its mechanical shaft power converted to DC electrical output by an alternator whose AC output is converted to DC output by a rectifier which, in turn, is connected to the DC bus. The combination 203 of an engine, its corresponding alternator and rectifier is referred to as an engine system. The voltage levels and power outputs of the engine systems are controlled independently by their individual excitation means incorporated in their alternators. The rectifiers are typically comprised of blocking diodes to prevent reverse power flow from the DC bus when the DC output voltage of a particular engine system is less than the voltage across the DC bus. As can be seen, the voltage across the DC bus is established by the engine system or systems with the highest DC output voltage to the bus. Engine systems with lower output DC voltages than the voltage across the bus will not provide power to the bus and will not receive power from the bus because of the blocking diodes contained in their rectifiers. Thus, by controlling the output voltage of any engine system by its particular excitation current, that engine system can be brought on-line to supply power to the DC bus. In this example, the DC bus supplies power to a load control apparatus 205 which controls the level of power to all four traction motors 204. The bus provides a power capacity at a predetermined voltage and the load control apparatus 205 controls the current flow, and hence the power level, to the motors 204. The traction motors 204 may be, for example, AC induction motors, DC motors, permanent magnet motors or switched reluctance motors. If the traction motors are AC motors, power is controlled by means of one or more inverters connected to the DC bus. Alternately, if the traction motors are a DC motors, power is controlled by means of one or more chopper circuits connected to the DC bus. In the example shown in FIG. 2, a single load control apparatus controls all of the traction motors Although not shown here, locomotives may be configured with each traction motor having its own load control apparatus.

A conventional battery operated starter motor can be used to start an engine. Alternately, a compressed air driven engine starter system may be utilized, making use of the compressed air supply associated with, for example, an air brake system. Alternately, the voltage control strategy articulated above is also compatible with the use of an induction alternator to provide electrical power from the engines to a DC bus. The use of an induction alternator, when at least one electrical power source is in operation supplying power to the DC bus, would allow power from the DC bus to be used to start or restart an engine that is turned off. This method of starting engines is known and is used to provide high starting power without the need of a separate starter motor. A pre-lubrication pump can also be operated directly from the DC bus or from an auxiliary power supply to lubricate a diesel engine just prior to starting it so as to extend its operational lifetime. While the above engine start-up procedures are well-known, they can be applied more readily utilizing the voltage control and DC bus architecture of the present invention.

Figure 3:
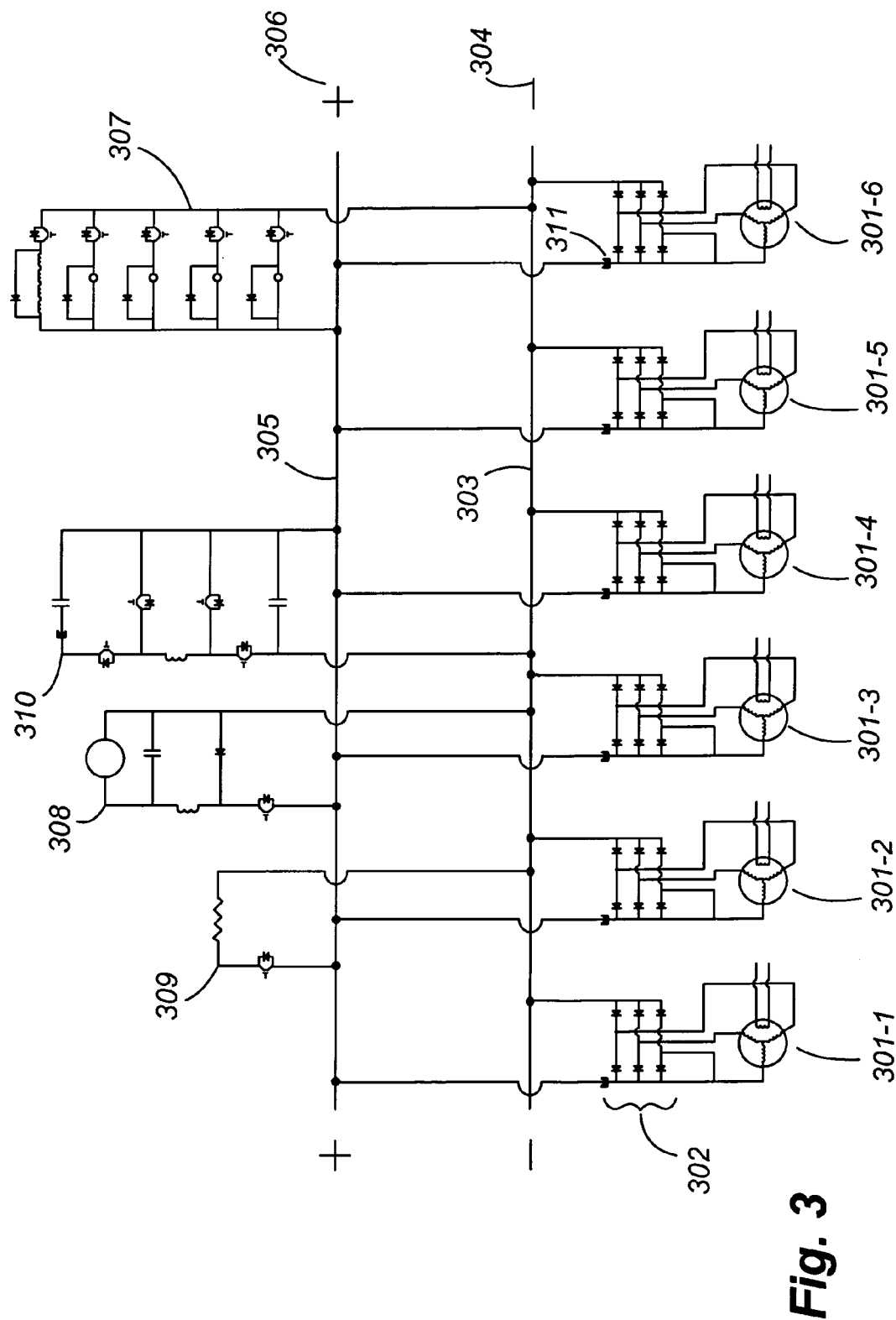
FIG. 3 is an example of the overall electrical schematic of a multi-engine locomotive.

FIG. 3 is an example of an overall electrical schematic of a multi-engine locomotive where six engines are used to provide power to a DC bus which in turn makes power available to an auxiliary power system, an energy storage system and a plurality of traction motors. In this example, the DC bus may also allow power from the traction motors to be dissipated during dynamic braking and/or provide power to an energy storage system which may be used to start one or more of the engines. In the example shown in FIG. 3, the DC bus is shown formed by two conductors 303 and 305. Conductor 303 is the negative side 304 and conductor 305 is the positive side 306. Six alternators 301 each with rectifying diodes 302 are shown connected in parallel to the DC bus. The output DC current from each rectifier 302 is measured by its own individual current sensor 311. A propulsion system 307 comprised of four DC traction motors, each controlled by an individual chopper circuit and common excitation circuit is shown connected to the DC bus in parallel with the engine systems. A typical auxiliary power system 308 is also shown connected to the DC bus in parallel with the engine systems and propulsion system. A typical dynamic braking system including a dissipating resistive grid 309 is also shown connected to the DC bus in parallel with the engine systems, propulsion system 307 and auxiliary power system 308. FIG. 3 also shows an example of a capacitor energy storage system 310 connected to the DC bus. Such an energy storage system 310 may be maintained in a state-of-charge by DC power from one or more of the engines or from power from a dynamic braking system by, for example, a buck/boost circuit. The energy storage system may be used to provide power for starting one or more engines by any of a number of well-known methods. As can be appreciated, the energy storage system can also be a battery pack or a flywheel storage system. A similar electrical architecture for a multi-engine locomotive was disclosed previously in U.S. Provisional Applications 60/607, 194 and 60/618,632; entitled "Locomotive Power Train Architecture". The following examples illustrate means of physically arranging various power supply components on a locomotive deck to optimize power density (power per unit volume) and/or power per unit deck length. This method is directed at a locomotive comprised of multiple engines or energy storage devices or combinations of the two. The method also allows for components to be easily added or deleted to change the power profile and operating characteristics of the locomotive. This method is fully compatible with the unique electrical architecture described for example in FIG. 3.

Figure 4A:
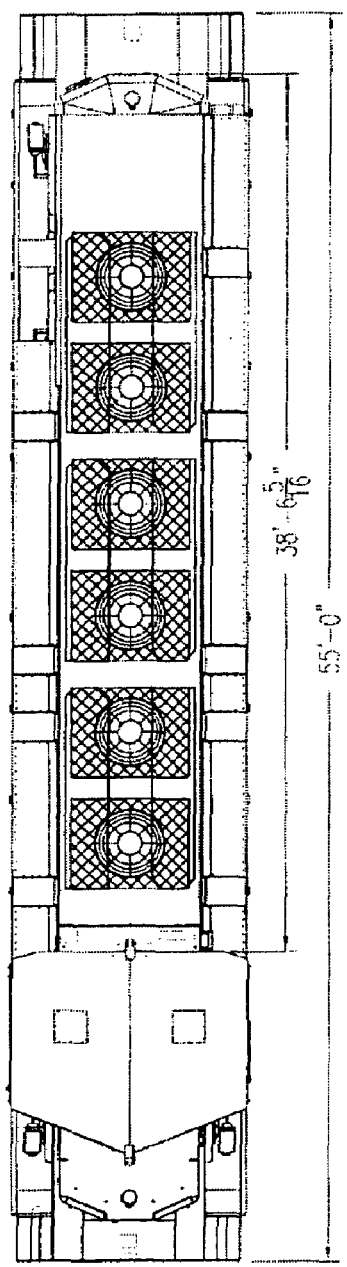
FIG. 4 a schematic of a modular configuration for a six-engine locomotive.
Figure 4B:
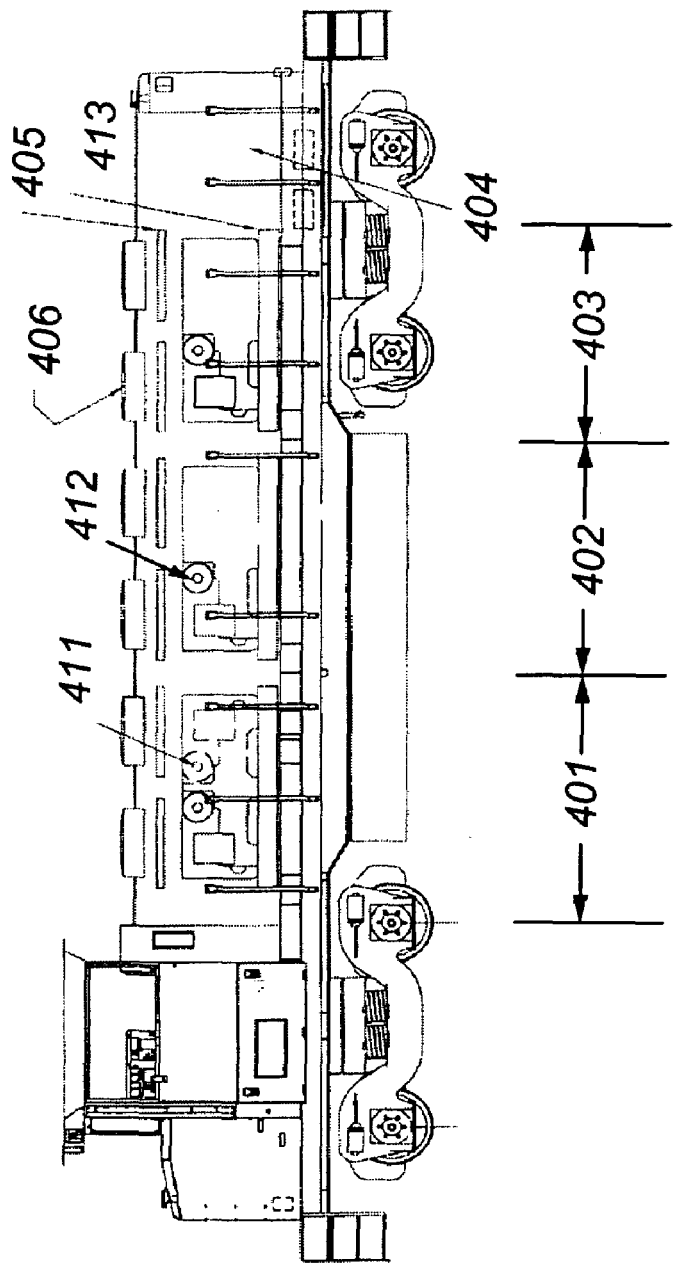

FIG. 4 is a schematic of a modular configuration for a multi-engine locomotive showing a plan view in FIG. 4*a* and a side view in FIG. 4*b*. This example illustrates, as shown in FIG. 4*b*, a locomotive with 3 bays 401, 402 and 403 where each bay is approximately 10 feet long. Each of the three bays 401, 402 and 403 contains two in-line diesel engines 411, 412 and 413 mounted side by side for a total of six diesel engines. Each in-line engine 401 has a power rating preferably in the range of about 400 kW to about 1,000 kW for a total locomotive power rating in the range of about 2,400 kW to about 8,000 kW. As discussed previously, this configuration of several diesel engines can have at least three important emissions control advantages. First, the engines can be smaller engines that typically run hotter than a single large engine and therefore the exhaust temperatures are higher which allows a more effective post-treatment of emissions. Second, with smaller engines, the residency times of combustion event are shorter which also is known to reduce overall production of emissions. Third, with the multiple smaller engine configuration, engines not needed can be idled or turned off and less overall fuel is consumed and therefore less overall emissions are generated. Multiple small engines can be shut down or re-started as needed to keep those that are running close to full load, thereby producing exhaust at a temperature conducive to effective post-treatment. In contrast, a single large engine will necessarily operate for considerable amounts of time at part-load or idle conditions which provide exhaust temperatures too low for effective post-treatment. The location of overhead cooling radiators 405 and cooling fans 406 and the additional space 404 for auxiliary power motors, compressors, power electronic components and the like is typical but may be located elsewhere. As can be appreciated, packaging the engines 411, 412 and 413 compactly is an important goal so that the locomotive can have, for example, full width walkways on either side of the locomotive. As can be further appreciated, the in-line diesel engines can be gas turbines, microturbines, Stirling engines or spark ignition engines. The dimensions shown in FIG. 4 are for illustration and are approximate for a large locomotive. This figure was disclosed previously in U.S. Provisional Applications 60/607,194 and 60/618,632 entitled "Locomotive Power Train Architecture".

Figures 5A, 5B:
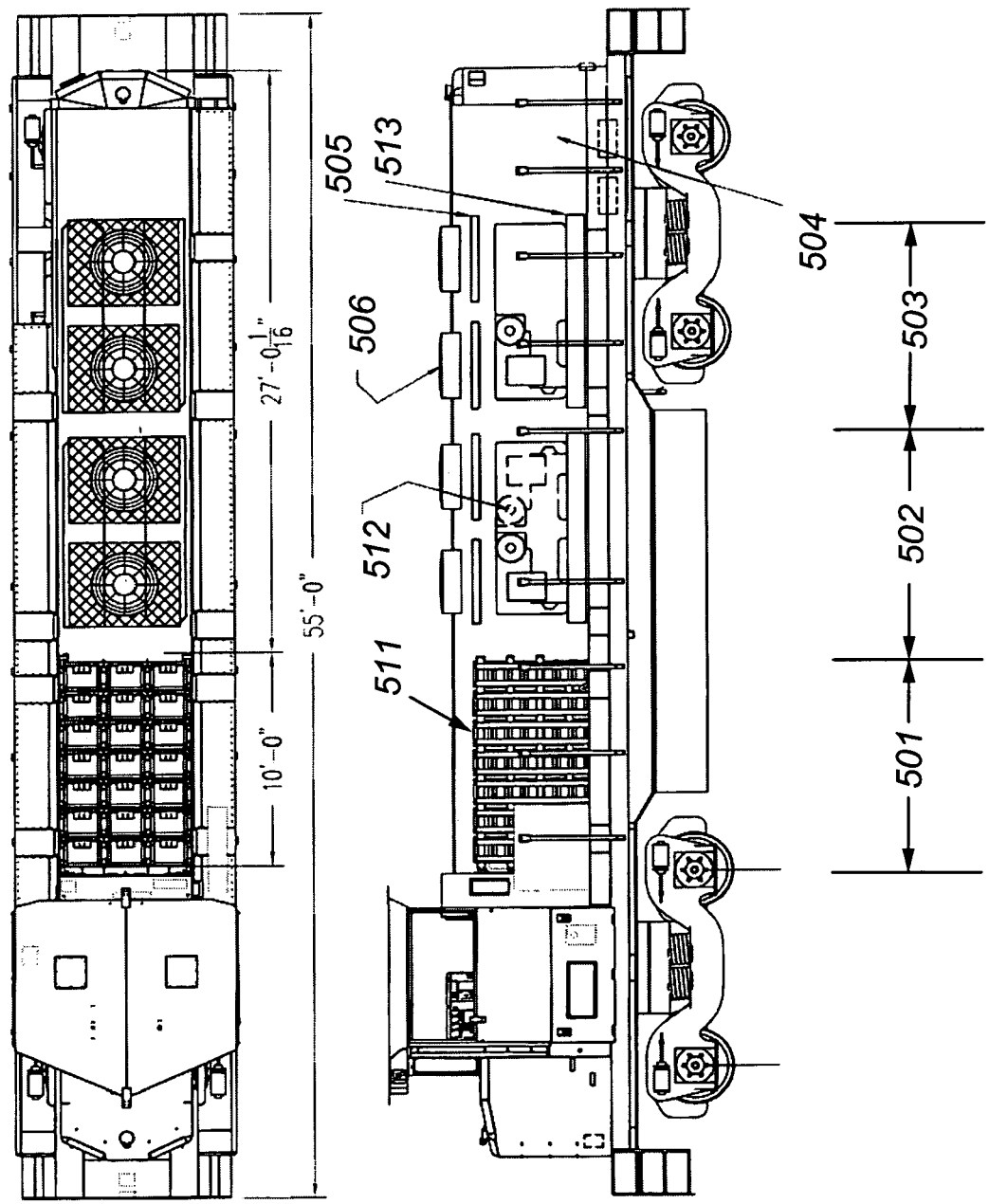
FIG. 5 a schematic of a modular configuration for a four-engine locomotive with a small energy storage system.

FIG. 5 is a schematic of a modular configuration for a dual-mode hybrid locomotive showing a plan view in FIG. 5a and a side view in FIG. 5b. This example illustrates, as shown in FIG. 5b, a locomotive with 3 bays 501, 502 and 503 where each bay is approximately 10 feet long. A battery pack 511 is shown occupying one of the bays 501. The battery pack would have an energy storage capacity in the range of about 400 to about 1,000 kW-hrs. The second and third bays 502 and 503 each contain two in-line diesel engines 512 and 513 mounted side by side for a total of four diesel engines. Each in-line engine would have a power rating in the range of about 400 kW to about 1,000 kW. In this configuration, the locomotive is a dual-mode hybrid which is suited to working primarily on diesel power only and using the battery pack primarily to boost power for acceleration or ascending grade. The battery pack 511 may be recharged by one or more of the diesel engines an/or by a regenerative braking system. The most likely application of this configuration is as a road switcher locomotive which operates in a yard for some of the time and a trunk line for much of the time. As can be appreciated, the more compact the packaging of the four in-line engines, the larger the battery pack energy storage system can be. This is very important if a significant portion of the regenerative braking energy is to be recovered. The dimensions shown in FIG. 5 are for illustration and are approximate for a large locomotive. The location of overhead cooling radiators 505 and cooling fans 506 and the additional space 504 for auxiliary power motors, compressors, power electronic components and the like is typical but may be located elsewhere. This figure was disclosed previously in U.S. Provisional Applications 60/607,194 and 60/618,632 entitled "Locomotive Power Train Architecture".

Figures 6A, 6B:
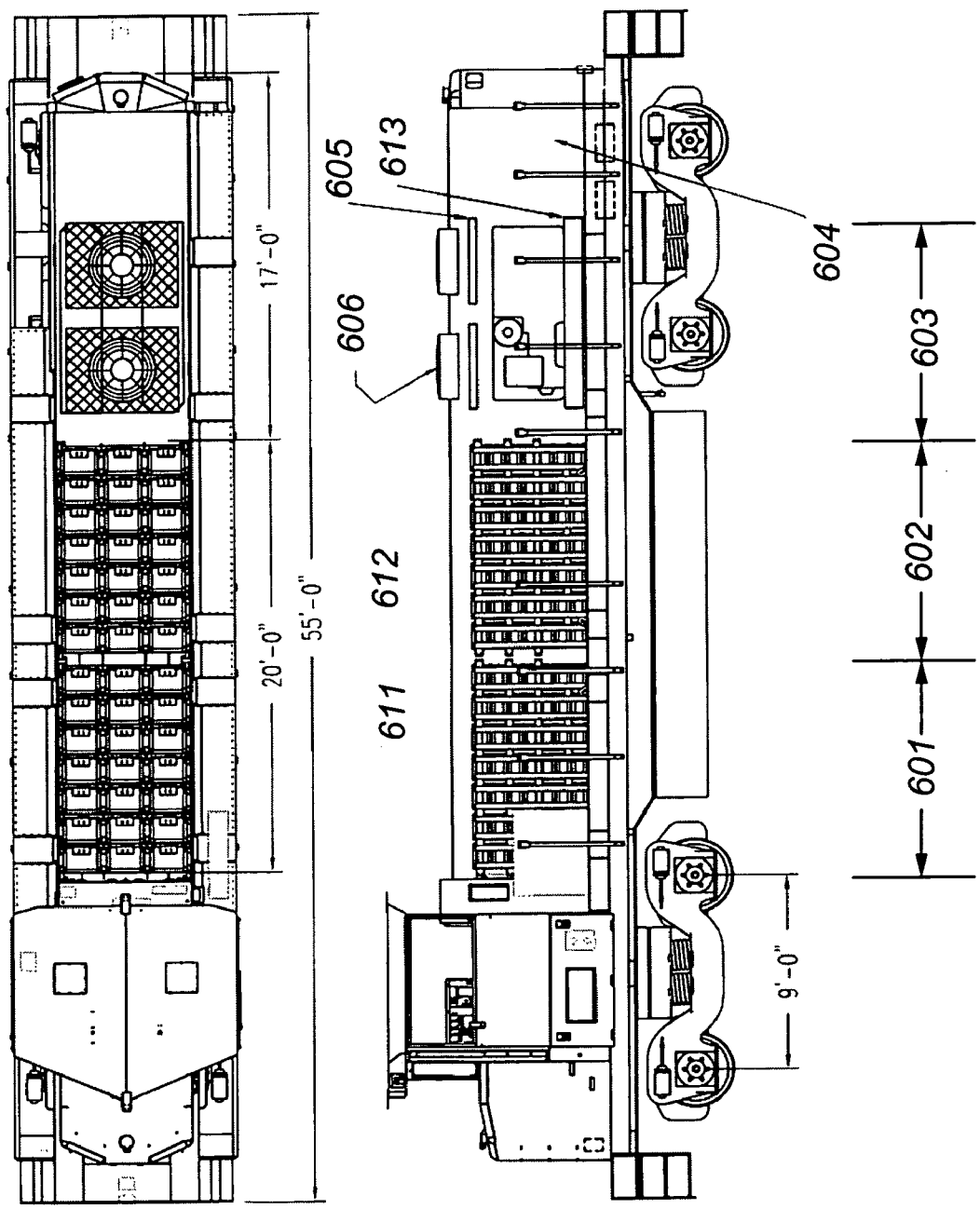
FIG. 6 a schematic of a modular configuration for a two-engine locomotive with a large energy storage system (battery-dominant hybrid configuration).

FIG. 6 is a schematic of a modular configuration for a battery dominant locomotive showing a plan view in FIG. 6a and a side view in FIG. 6b. This example illustrates, as shown in FIG. 6b, a locomotive with 3 bays 601, 602 and 603 where each bay is approximately 10 feet long. Two battery packs 611 and 612 are shown occupying two bays 601 and 602. Each battery pack would have an energy storage capacity in the range of about 400 to about 1,000 kW-hrs. The third bay 603 contains two in-line diesel engines 613 mounted side by side. Each in-line engine would have a power rating in the range of about 400 kW to about 1,000 kW. In this configuration, the locomotive is a battery-dominant hybrid which is suited to working primarily on battery power only and from time-to-time on both battery and diesel power. The most likely application of this configuration is as a yard switcher locomotive which operates primarily at low speeds but requires substantial tractive effort from time-to-time when it assembles and moves train cars. As can be appreciated, the battery packs illustrated in FIGS. 5 and 6 can be capacitor banks and the in-line diesel engines in FIGS. 4, 5 and 6 can be gas turbines.

FIG. 7 a schematic top (FIG. 7a) and side view (FIG. 7b) of a modular configuration for a multi-engine locomotive based on V type engines. Four V-type engines are shown in two nested pairs 701. Each engine is mechanically coupled to an alternator/rectifier unit. The deck space in front of the engines houses the cooling equipment. The deck space behind the engines houses the power electrical equipment. The dimensions shown in FIG. 7 are for illustration and are approximate for a large locomotive. The location of overhead cooling fans, the control cab and the additional space for auxiliary power motors, compressors and cooling systems are typical but may be located elsewhere. The configuration of V-type engines has approximately the same power density as a locomotive of similar power based on a single engine. However, this configuration has a number of advantages over a locomotive with a single large engine. The advantages include:

(a) smaller engines in general have lower fuel consumption compared to a single large engine of the same power for all railroad duty cycles.

(b) smaller engines typically have lower gaseous and particulate emissions in part because the physics of a shorter combustion cycle is better suited for reduction of emissions.

(c) The smaller engines can be removed and replaced with lighter more available lifting equipment.

(d) When a small engine fails, the locomotive can still continue to operate and work in all but the higher notch settings.

(e) The post treatment apparatus required for the smaller engines is typically less bulky.

(f) The radiators for the smaller engines can be mounted above the engines to optimize usage of deck space.

(g) With more efficient usage of deck space, hot air from the superchargers can be more easily cooled to help keep emissions within specification.

(h) Engine usage can be rotated to optimize time between maintenance periods.

(I) The locomotive can be readily reconfigured to a hybrid. The hybrid can be an engine-dominant or a battery-dominant locomotive.

FIG. 8 a schematic top (FIG. 8a) and side view (FIG. 8b) of a modular configuration for a multi-engine locomotive based on in-line type engines. Six in-line engines are shown in three nested pairs 801. Each engine is mechanically coupled to an alternator/rectifier unit. The deck space in front of the engines houses the cooling equipment. The deck space behind the engines houses the power electrical equipment. The dimensions shown in FIG. 8 are for illustration and are approximate for a large locomotive. The location of overhead cooling fans, the control cab and the additional space for auxiliary power motors, compressors and cooling systems are typical but may be located elsewhere. The configuration of in-line type engines typically has a greater power density than a locomotive of similar power based on a single engine. In addition, this more preferred configuration has all the other advantages described in FIG. 7 for the multiple V-type engine configuration.

Effective Power Density

Locomotives are usually rated on traction horsepower which is related to the electrical power sent to the traction motors after subtracting parasitic and auxiliary loads, and alternator inefficiencies. To make a comparison that is not dependent on the drive train (power conversion equipment and type of traction motors), calculations of power density are based on engine brake horsepower.

Power per length of locomotive deck is based on the length along the locomotive deck occupied by the engine, alternator and related engine equipment. This equipment typically includes a blower that supplies cooling air to the alternator, cooling radiators, starter motors and there batteries and the like. The volume occupied by the engine system is taken as deck length times hood width and the hood height. Deck volume occupied by the engine system and engine brake power are used to calculate the power density of the engine system.

The following table summarizes the power per length and power densities of two conventional single-engine locomotives; a four V-type engine locomotive configuration (FIG. 7); and a six in-line type engine locomotive configuration (FIG. 8).

|  | Locomotive | | | |
| --- | --- | --- | --- | --- |
|  | Single Engine | Single Engine | Four Engine | Six Engine |
| Engine Power (kW) | 2,460 | 3,100 | 520 | 510 |
| Number of Engines | 1 | 1 | 4 | 6 |
| Total Locomotive Power (kW) | 2,460 | 3,100 | 2,080 | 3,060 |
| Deck Length (m) | 9.91 | 10.67 | 10.01 | 9.14 |
| Deck Volume (m³) | 52.5 | 56.5 | 46.9 | 42.5 |
| Power per Length (kW/m) | 248.4 | 290.1 | 206.6 | 335.2 |
| Power Density (kW/m³) | 46.9 | 54.8 | 44.1 | 72.0 |

As can be seen from the above table, the four V-type engine locomotive configuration has a power density comparable to that of the two conventional single-engine locomotives. The more preferred six in-line engine locomotive configuration has a substantially greater power density than the two conventional single-engine locomotives. The six-engine configuration has approximately the same total power as the larger single-engine locomotive but takes up considerably less deck length and volume. This is in part possible with a multi-engine locomotive, in which a single smaller starter motor system can be used, the cooling radiators can be positioned above the engines and other systems such as for example, the oil lubricating system can be distributed.

Figure 9B:
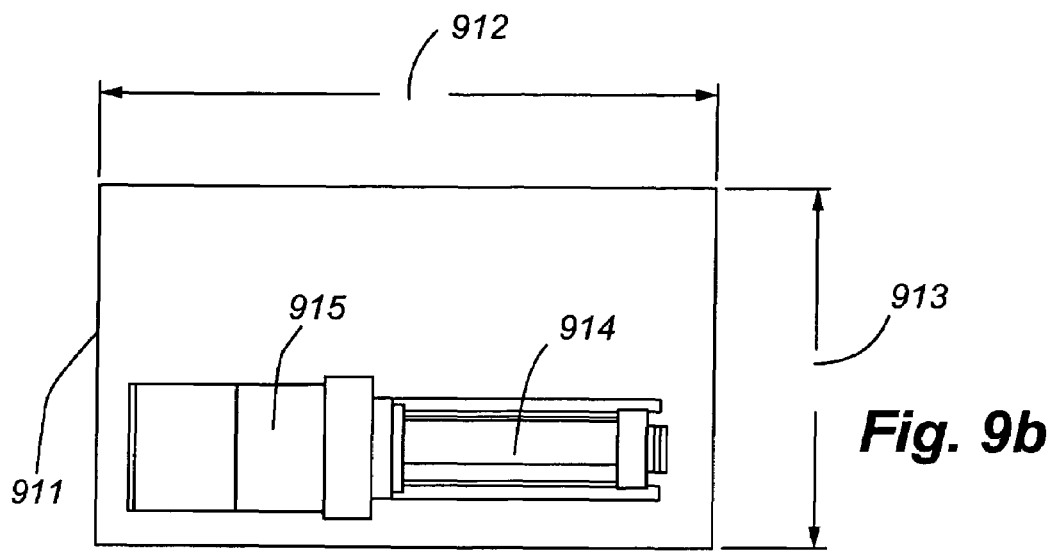
FIG. 9 is a schematic plan view and side view of an in-line engine.
Figure 9A:
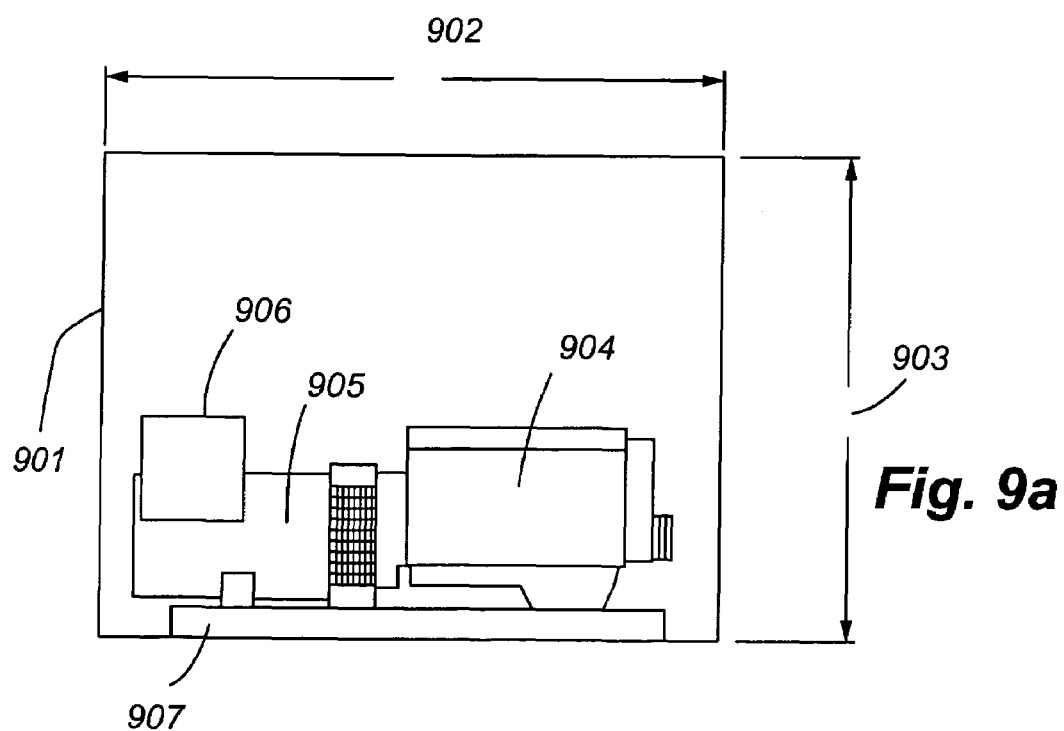

FIG. 9 is a schematic plan view and side views of an in-line engine. FIG. 9a shows one side of an engine block 904, alternator apparatus 905 and an electrical apparatus 906 that typically contains the rectifier equipment for the alternator 905. Not shown in this figure are engine system ancillary equipment such as for example an engine turbo charger, fuel filter, air filter, oil lubrication reservoir, exhaust silencer, oil filter, starter motor apparatus, coolant radiators and cooling fans. The engine 904, alternator 905 and ancillary engine equipment all comprise the engine system which is typically mounted on a frame 907 attached to the deck of the locomotive. A "box" 901 represents the approximate height 903 and length 902 required for the engine system. For the locomotives shown in the previous figures, the approximate height 903 is in the range of about 2.2 to 2.6 meters and the approximate length 902 is in the range of about 2.8 to 3.3 meters FIG. 9b shows a plan view illustrating the compact width profile of the engine alternator package showing the engine 914 and the alternator 915. A "box" 911 represents the approximate width 913 for a nested pair of the in-line engine systems and length 912 required for the engine system. Ancillary engine system equipment such as an oil level dipstick, oil filter, fuel filter and air filter are not shown but would be mounted on the outer side which is an example of how these often-used and replaced items are placed for ready maintenance and replacement. The approximate width 913 is in the range of about 1.7 to 2 meters and the approximate length 902 is in the range of about 2.8 to 3.3 meters.

Figure 10:
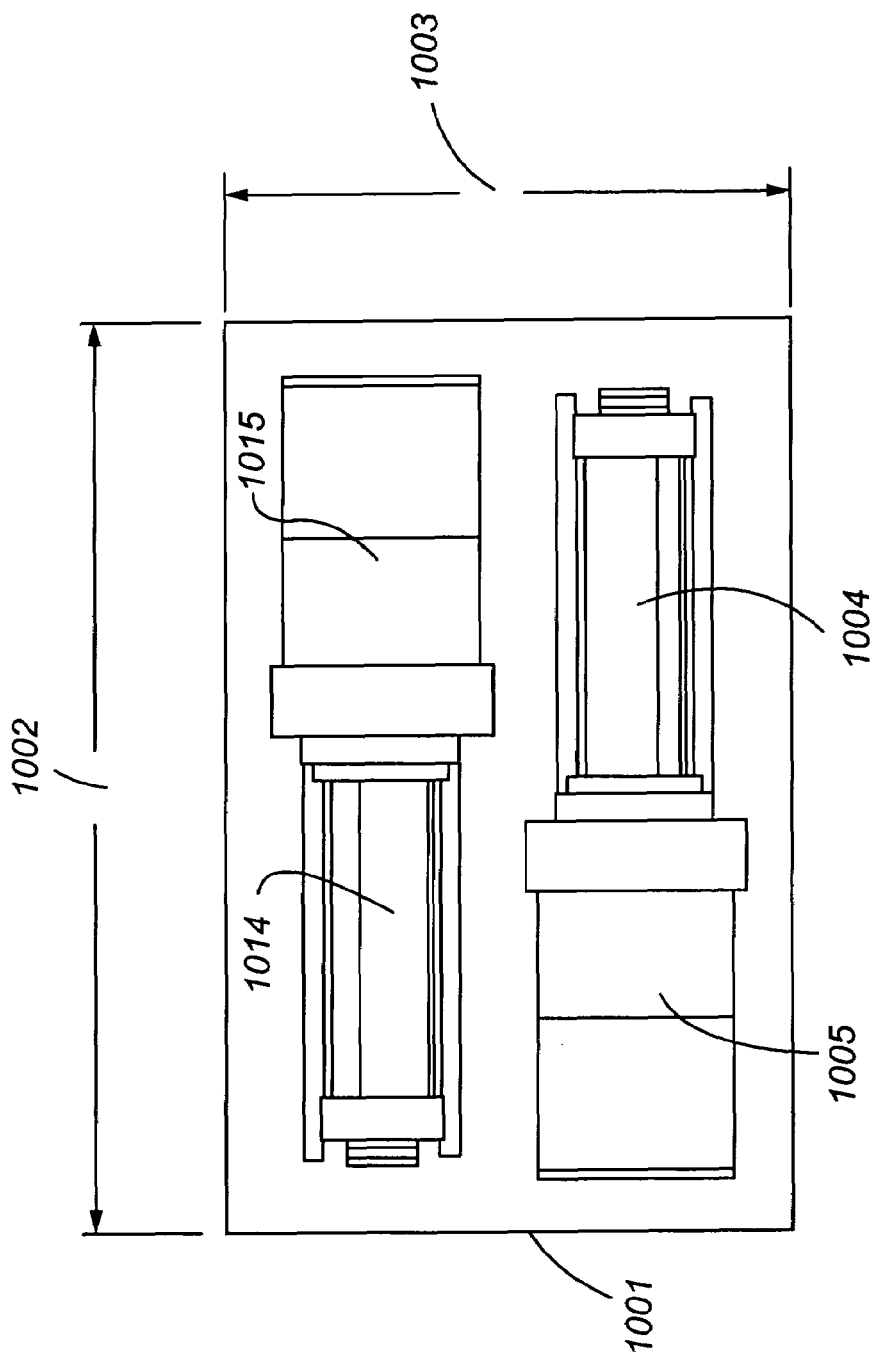
FIG. 10 is a schematic plan view of two side-by-side in-line engines.

FIG. 10 is a schematic plan view of two side-by-side in-line engines. A "box" 1001 represents the approximate width 1003 and length 1002 required for the nested engine system pair. A first engine 1004 is shown with its alternator/rectifier apparatus 1005 facing in one direction while a second engine 1014 is shown with its alternator/rectifier apparatus 1015 facing in the opposite direction. As discussed in FIG. 9, the often-used and replaced items such as the oil level dipsticks, air filters, fuel filters and the like are mounted on the outside of the two-engine module for ready maintenance and replacement. For the locomotives shown in the previous figures, the approximate width 1003 is in the range of about 1.7 to 2 meters and the approximate length 1002 is in the range of about 2.8 to 3.3 meters.

Figure 11:
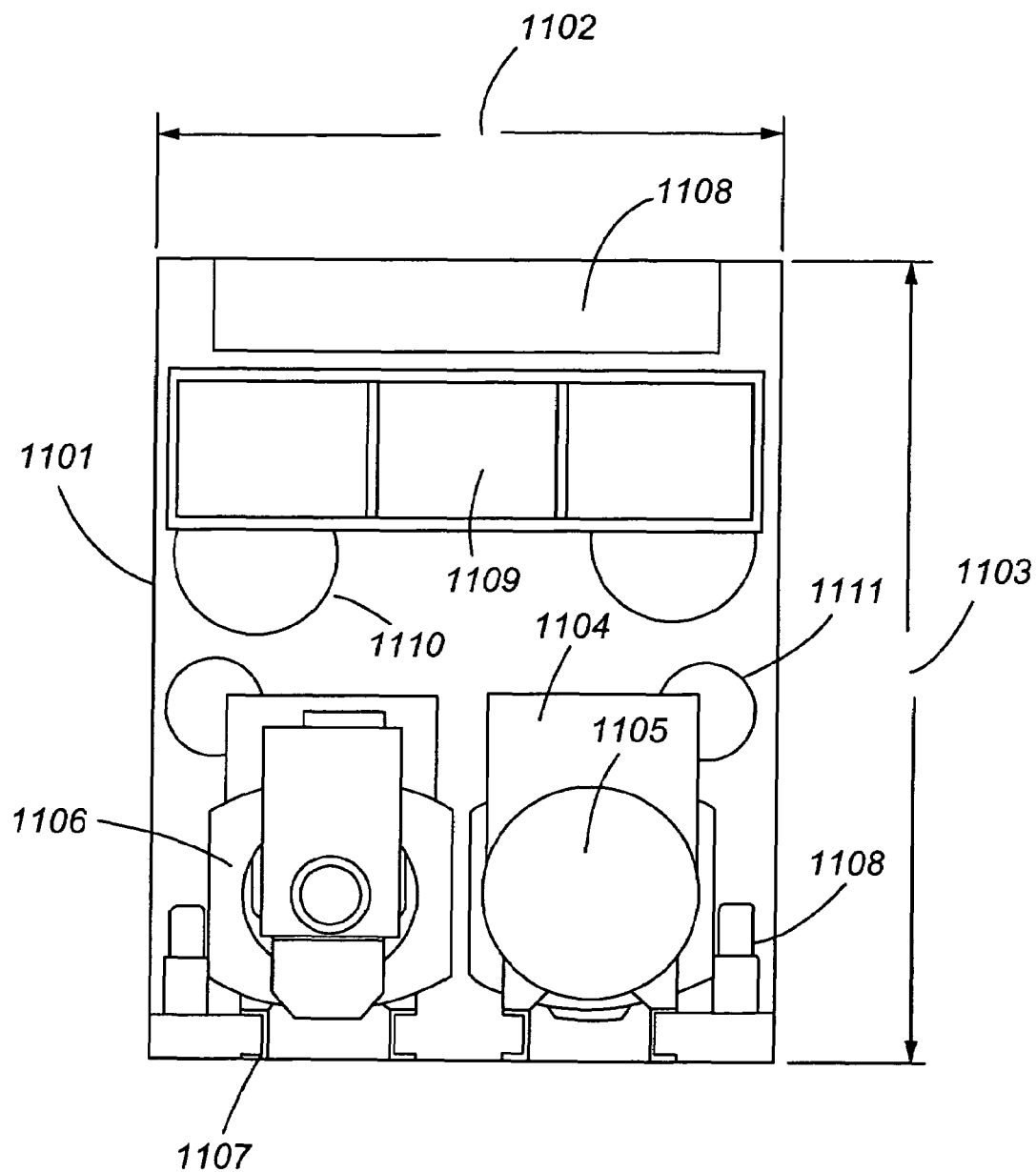
FIG. 11 is a schematic end view of two side-by-side in-line engines.

FIG. 11 is a schematic end view of two nested in-line engines mounted side by side and corresponds to FIG. 10. There are many ways to mount engines side by side and the goal is to mount the engines in the minimum volume so as to maximize power per unit volume on the locomotive deck. The engines 1106, alternators 1105 and rectifiers 1104 are shown mounted on a skid assembly 1107 which may provide shock isolation as well as a convenient means to remove a pair of engines for servicing, rebuilding or replacement. A common engine exhaust system 1109 and cooling fan 1108 are shown mounted above the two engines. A "box" 1101 represents the approximate height 1103 and width 1102 required for the nested engine system pair. Examples of typical ancillary engine system equipment are shown and include fuel filters 1108 mounted on the outside of engines 1105 for convenience of service and replacement, turbo charger intakes 1111 and lubricating oil reservoirs 1110. For the locomotives shown in the previous figures, the approximate height 1103 is in the range of about 2.2 to 2.6 meters and the approximate width 1102 is in the range of about 1.7 to 2 meters.

A number of variations and modifications of the invention can be used. As will be appreciated, it would be possible to provide for some features of the invention without providing others. For example, in one alternative embodiment, the various inventive features are applied to vehicles other than locomotives, such as cars, railroad cars, and trucks. A number of variations and modifications of the invention can be used. It would be possible to provide for some features of the invention without providing others.

The present invention, in various embodiments, includes components, methods, processes, systems and/or apparatus substantially as depicted and described herein, including various embodiments, sub-combinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A locomotive, comprising:
    a plurality of engines, each engine having a corresponding power rating and all of the engines have a cumulative power rating that is a sum of the corresponding power ratings;
    at least one converter to convert mechanical energy outputted by the engines to Direct Current (DC) electrical energy;
    at least one traction motor operable to receive electrical energy and, in response, propel the vehicle;
    a DC bus connected to the engines, the at least one converter, and the at least one traction motor and operable to transfer electrical energy from the at least one converter to the at least one traction motor; and
    a control system operable to control operations of the engines,
    wherein the plurality of engines are configured to provide at least one of a power-per-length and power density that is greater than the at least one of a power-per-length, the power density of a single-engine locomotive having a power rating approximately the same as the cumulative power rating, wherein, in a selected time interval, a first engine outputs a level of mechanical energy corresponding to a first percentage of the first engine's corresponding power rating, and a second engine outputs a level of mechanical energy corresponding to a second percentage of the second engine's corresponding power rating, wherein the first percentage is less than the second percentage, wherein the control system controls which engines provide energy to the DC bus by setting at least one of an output voltage of the at least one converter, the DC bus voltage, and a voltage associated with the at least one traction motor, wherein the first and second engines respectively have first and second converters and wherein the first and second engines and the corresponding first and second converters are located side-by-side and face in different directions.

2. The locomotive of claim 1, wherein the plurality of engines comprise from 3 to 8 engines, wherein the engines are not synchronized, wherein at least two of the engines have different power ratings, and wherein, in the selected time interval, the first and second engines are operated simultaneously at different revolutions-per-minute.

3. The locomotive of claim 1, wherein the first and second engines have at least one common element of a lubricating system, emission system, and/or cooling system.

4. The locomotive of claim 1, wherein at least one of an oil filter, air filter, oil dip stock, fuel filter, starter motor, and battery is located on an outwardly facing side of each of the first and second engines.

5. The locomotive of claim 1, wherein the plurality of engines are V engines connected in parallel relative to the DC bus.

6. The locomotive of claim 1, wherein the plurality of engines are in-line engines connected in parallel relative to the DC bus.

7. The locomotive of claim 1, wherein the at least one converter is an alternator and a rectifier and wherein the at least converter comprises a blocking diode to inhibit reverse energy flow from the DC bus to the engines.

8. The locomotive of claim 1, wherein each of the power ratings ranges from about 400 kW to about 1,000 kW and the cumulative power rating ranges from about 2,400 kW to about 8,000 kW.

9. The locomotive of claim 1, further comprising an energy storage system connected to the bus for storing electrical energy and providing electrical energy to the bus.

10. The locomotive of claim 6, wherein the at least one converter comprises an alternator and rectifier, wherein first and second in-line engines are in a nested relationship to one another, each of the first and second in-line engines comprising an engine block, alternator, and rectifier, and wherein engine blocks, alternators, and rectifiers of the first and second engines are positioned on opposing sides of the locomotive.

11. The locomotive of claim 10, wherein the first and second in-line engines are positioned within a boxed space and wherein the boxed space has a height ranging from about 2.2 to about 2.6 meters, a length ranging from about 2.8 to about 3.3 meters and a width ranging from about 1.7 to about 2 meters.

12. The locomotive of claim 10, wherein the first engine's block is adjacent to the second engine's alternator and rectifier and wherein the second engine's block is adjacent to the first engine's alternator and rectifier.

13. The locomotive of claim 10, wherein the first and second engines are mounted on a skid assembly, the skid assembly being removably connected to the locomotive, whereby the first and second engines may be removed simultaneously from the locomotive.

14. A locomotive, comprising:
a plurality of engines, each engine having a corresponding power rating and all of the engines have a cumulative power rating that is a sum of the corresponding power ratings;
at least one converter to convert mechanical energy outputted by the engines to Direct Current (DC) electrical energy;
at least one traction motor operable to receive electrical energy and, in response, propel the vehicle;
a DC bus connected to the engines, the at least one converter, and the at least one traction motor and operable to transfer electrical energy from the at least one converter to the at least one traction motor; and
a control system operable to control operations of the engines,
wherein, in a selected time interval, a first engine outputs a level of mechanical energy corresponding to a first percentage of the first engine's corresponding power rating, and a second engine outputs a level of mechanical energy corresponding to a second percentage of the second engine's corresponding power rating, wherein the first percentage is less than the second percentage, wherein the control system controls which engines provide energy to the DC bus by setting at least one of an output voltage of the at least one converter, the DC bus voltage, and a voltage associated with the at least one traction motor, wherein the first and second engines respectively have first and second converters and wherein the first and second engines and the corresponding first and second converters are located side-by-side and face in different directions.

15. The locomotive of claim 14, wherein the plurality of engines are configured to provide at least one of a power-per-length and power density that is greater than the at least one of a power-per-length and power density of a single-engine locomotive having a power rating approximately the same as the cumulative power rating.

16. The locomotive of claim 14, wherein the plurality of engines comprise from 3 to 8 engines, wherein the engines are not synchronized, wherein at least two of the engines have different power ratings, and wherein, in the selected time interval, the first and second engines are operated simultaneously at different revolutions-per-minute.

17. The locomotive of claim 14, wherein the first and second engines have at least one common element of a lubricating system, emission system, and/or cooling system.

18. The locomotive of claim 14, wherein at least one of an oil filter, air filter, oil dip stock, fuel filter, starter motor, and battery is located on an outwardly facing side of each of the first and second engines.

19. The locomotive of claim 14, wherein the plurality of engines are V engines connected in parallel relative to the DC bus.

20. The locomotive of claim 14, wherein the plurality of engines are in-line engines connected in parallel relative to the DC bus.

21. The locomotive of claim 14, wherein the at least one converter is an alternator and a rectifier and wherein the at least converter comprises a blocking diode to inhibit reverse energy flow from the DC bus to the engines.

22. The locomotive of claim 15, wherein each of the power ratings ranges from about 400 kW to about 1,000 kW and the cumulative power rating ranges from about 2,400 kW to about 8,000 kW.

23. The locomotive of claim 14, further comprising an energy storage system connected to the bus for storing electrical energy and providing electrical energy to the bus.

24. The locomotive of claim 20, wherein the at least one converter comprises an alternator and rectifier, wherein first and second in-line engines are in a nested relationship to one another, each of the first and second in-line engines comprising an engine block, alternator, and rectifier, and wherein engine blocks, alternators, and rectifiers of the first and second engines are positioned on opposing sides of the locomotive.

25. The locomotive of claim 24, wherein the first and second in-line engines are positioned within a boxed space and wherein the boxed space has a height ranging from about 2.2 to about 2.6 meters, a length ranging from about 2.8 to about 3.3 meters and a width ranging from about 1.7 to about 2 meters.

26. The locomotive of claim 24, wherein the first engine's block is adjacent to the second engine's alternator and rectifier and wherein the second engine's block is adjacent to the first engine's alternator and rectifier.

27. The locomotive of claim 24, wherein the first and second engines are mounted on a skid assembly, the skid assembly being removably connected to the locomotive, whereby the first and second engines may be removed simultaneously from the locomotive.

28. A locomotive, comprising:
a plurality of engines, each engine having a corresponding power rating and all of the engines have a cumulative power rating that is a sum of the corresponding power ratings;
at least one converter to convert mechanical energy outputted by the engines to Direct Current (DC) electrical energy;
at least one traction motor operable to receive electrical energy and, in response, propel the vehicle; and
a DC bus connected to the engines, the at least one converter, and the at least one traction motor and operable to transfer electrical energy from the at least one converter to the at least one traction motor,
wherein the plurality of engines are in-line engines connected in parallel relative to the DC bus, wherein the first and second engines respectively have first and second converters and wherein the first and second engines and the corresponding first and second converters are located side-by-side and face in different directions.

29. The locomotive of claim 28, further comprising: a control system operable to control operations of the engines, wherein, in a selected time interval, a first engine outputs a level of mechanical energy corresponding to a first percentage of the first engine's corresponding power rating, and a second engine outputs a level of mechanical energy corresponding to a second percentage of the second engine's corresponding power rating and wherein the first percentage is less than the second percentage and wherein the control system controls which engines provide energy to the DC bus by setting at least one of an output voltage of the at least one converter, the DC bus voltage, and a voltage associated with the at least one traction motor.

30. The locomotive of claim 28, wherein the plurality of engines comprise from 3 to 8 engines, wherein the engines are not synchronized, wherein at least two of the engines have different power ratings, and wherein, in the selected time interval, the first and second engines are operated simultaneously at different revolutions-per-minute.

31. The locomotive of claim 28, wherein the first and second engines have at least one common element of a lubricating system, emission system, and/or cooling system.

32. The locomotive of claim 28, wherein at least one of an oil filter, air filter, oil dip stock, fuel filter, starter motor, and battery is located on an outwardly facing side of each of the first and second engines.

33. The locomotive of claim 28, wherein the plurality of engines are configured to provide at least one of a power-per-length and power density that is greater than the at least one of a power-per-length and power density of a single-engine locomotive having a power rating approximately the same as the cumulative power rating.

34. The locomotive of claim 28, wherein the at least one converter is an alternator and a rectifier and wherein the at least converter comprises a blocking diode to inhibit reverse energy flow from the DC bus to the engines.

35. The locomotive of claim 33, wherein each of the power ratings ranges from about 400 kW to about 1,000 kW and the cumulative power rating ranges from about 2,400 kW to about 8,000 kW.

36. The locomotive of claim 28, further comprising an energy storage system connected to the bus for storing electrical energy and providing electrical energy to the bus.

37. The locomotive of claim 28, wherein the at least one converter comprises an alternator and rectifier, wherein first and second in-line engines are in a nested relationship to one another, each of the first and second in-line engines comprising an engine block, alternator, and rectifier, and wherein engine blocks, alternators, and rectifiers of the first and second engines are positioned on opposing sides of the locomotive.

38. The locomotive of claim 37, wherein the first and second in-line engines are positioned within a boxed space and wherein the boxed space has a height ranging from about 2.2 to about 2.6 meters, a length ranging from about 2.8 to about 3.3 meters and a width ranging from about 1.7 to about 2 meters.

39. The locomotive of claim 37, wherein the first engine's block is adjacent to the second engine's alternator and rectifier and wherein the second engine's block is adjacent to the first engine's alternator and rectifier.

40. The locomotive of claim 37, wherein the first and second engines are mounted on a skid assembly, the skid assembly being removably connected to the locomotive, whereby the first and second engines may be removed simultaneously from the locomotive.

\* \* \* \* \*